US006001327A

United States Patent [19]

Harless

[11] Patent Number: 6,001,327

[45] Date of Patent: Dec. 14, 1999

[54] SEALED-BLADDERED CHEMICAL PROCESSING METHOD AND APPARATUS

[75] Inventor: D. Phillip Harless, Knoxville, Tenn.

[73] Assignee: Lockheed Martin Energy Systems, Inc., Oak Ridge, Tenn.

[21] Appl. No.: 09/108,983

[22] Filed: Jul. 1, 1998

[51] Int. Cl.[6] ....... B01D 11/00

[52] U.S. Cl. ....... 423/658.5; 423/2; 422/159; 422/238; 422/239; 422/281; 422/296; 976/DIG. 279

[58] Field of Search ....... 422/159, 238, 422/239, 281, 296; 423/2, 658.5; 976/DIG. 279

[56] References Cited

U.S. PATENT DOCUMENTS

| | | | |
|---|---|---|---|
| 3,352,645 | 11/1967 | Faugeras et al. | 422/159 |
| 3,519,401 | 7/1970 | Hellman | 210/636 |
| 3,607,107 | 9/1971 | Ayers | 422/159 |
| 4,061,480 | 12/1977 | Frye et al. | 55/356 |
| 4,246,238 | 1/1981 | Goldacker et al. | 422/275 |
| 4,347,224 | 8/1982 | Beckert et al. | 422/277 |
| 4,521,400 | 6/1985 | Hodgson et al. | 423/658.5 |
| 4,717,420 | 1/1988 | Duerksen | 75/84.1 R |
| 4,995,948 | 2/1991 | Poa et al. | 204/1.5 |
| 5,389,123 | 2/1995 | Bronson | 75/393 |

*Primary Examiner*—Ngoclan Mai
*Attorney, Agent, or Firm*—Nexsen Pruet Jacobs & Pollard, LLP

[57] ABSTRACT

A method and apparatus which enables a complete multi-stepped chemical treatment process to occur within a single, sealed-bladdered vessel 31. The entire chemical process occurs without interruption of the sealed-bladdered vessel 31 such as opening the sealed-bladdered vessel 31 between various steps of the process. The sealed-bladdered vessel 31 is loaded with a batch to be dissolved, treated, decanted, rinsed and/or dried. A pressure filtration step may also occur. The self-contained chemical processing apparatus 32 contains a sealed-bladder 32, a fluid pump 34, a reservoir 20, a compressed gas inlet, a vacuum pump 24, and a cold trap 23 as well as the associated piping 33, numerous valves 21,22, 25,26,29,30,35,36 and other controls associated with such an apparatus. The claimed invention allows for dissolution and/or chemical treatment without the operator of the self-contained chemical processing apparatus 38 coming into contact with any of the process materials.

13 Claims, 4 Drawing Sheets

SEALED-BLADDERED CHEMICAL PROCESSING METHOD AND APPARATUS

The United States Government has rights in this invention pursuant to contract no. DE-AC05-84OR21400 between the United States Department of Energy and Lockheed Martin Energy Systems, Inc.

BACKGROUND OF THE INVENTION

The present invention relates to a method and apparatus for performing a multi-stepped chemical process, such as a dissolution process or a treatment process, in a single sealed self-contained vessel. The process is performed without the vessel being opened between steps.

SUMMARY OF THE INVENTION

The sealed-bladdered chemical processing apparatus and method are self-contained and were designed to overcome various obstacles present in chemical processes to date. This apparatus and method were developed to address the issues and problems associated with chemical dissolution processes, in particular a Saltless Direct Oxide Reduction process. However, it can be applied to a variety of other multi-step chemical processes such as photoprocessed circuit board manufacturing where developer solution is followed by rinse, then by fixer solution, again by rinse and then by coating. The present invention can help eliminate waste or cross-contamination of the process streams when used in such a process. This method and apparatus can also be used to dissolve solids from a solid matrix to separate soluble and insoluble solids, such as those present in the mining industry and in chemical purification systems. Different liquid chemical treatments can be administered to solids without breaking the seals or containment such as in the type of system where textiles are bleached and then dyed and also where woods and wood products are pressure treated and coated. Another possible use of such a system is where a soluble contaminate is decontaminated from an insoluble solid with total process containment, for example in the removal of radioactive contamination from insoluble media and removal of soluble toxic contaminates for insoluble media. This same process could be enlarged or decreased in size with different media types and meshes to match the desired process application.

Some of the objectives accomplished by the sealed-bladdered chemical processes method and apparatus are that the operator may avoid or minimize contact with the process chemicals and solvents. Using the claimed method and apparatus in a chemical dissolution process eliminates the need to transfer dissolution material to different containers. For example, the presently claimed invention minimizes the currently multi-stepped process of Saltless Direct Oxide Reduction from numerous steps such as grinding the slag, transferring the slag to an acid-filled beaker, dissolving the reducing metal oxide in the beaker while stirring the mixture, transferring the dissolution mixture into a pressure filter or filtering centrifuge so as to separate the powdered uranium from the acid, rinsing the acid off the powder, refiltering the uranium separating it from the rinse water, transferring the filter media containing the uranium powder to a vacuum system to allow drying, and transferring the dry powder out of the vacuum, to a mere three step process of loading the process feed, opening and closing valves and unloading the dry product. With this method and apparatus, the process operation performed by the operator is reduced to only the necessary tasks of loading the feed, opening and closing various valves and unloading the dry product, thus allowing dry feed materials to be loaded and dry product to be removed from the system. The sealed-bladdered chemical processing method and apparatus also minimize the amount of processing equipment needed within the process area. Contamination of the process area is also minimized as well as the actual size of the process area. For example, a 1 Kg pilot process has a smaller processing footprint than that of a 100 g small laboratory scale process currently in use.

DETAILED DESCRIPTION OF THE INVENTION

Figure 1:
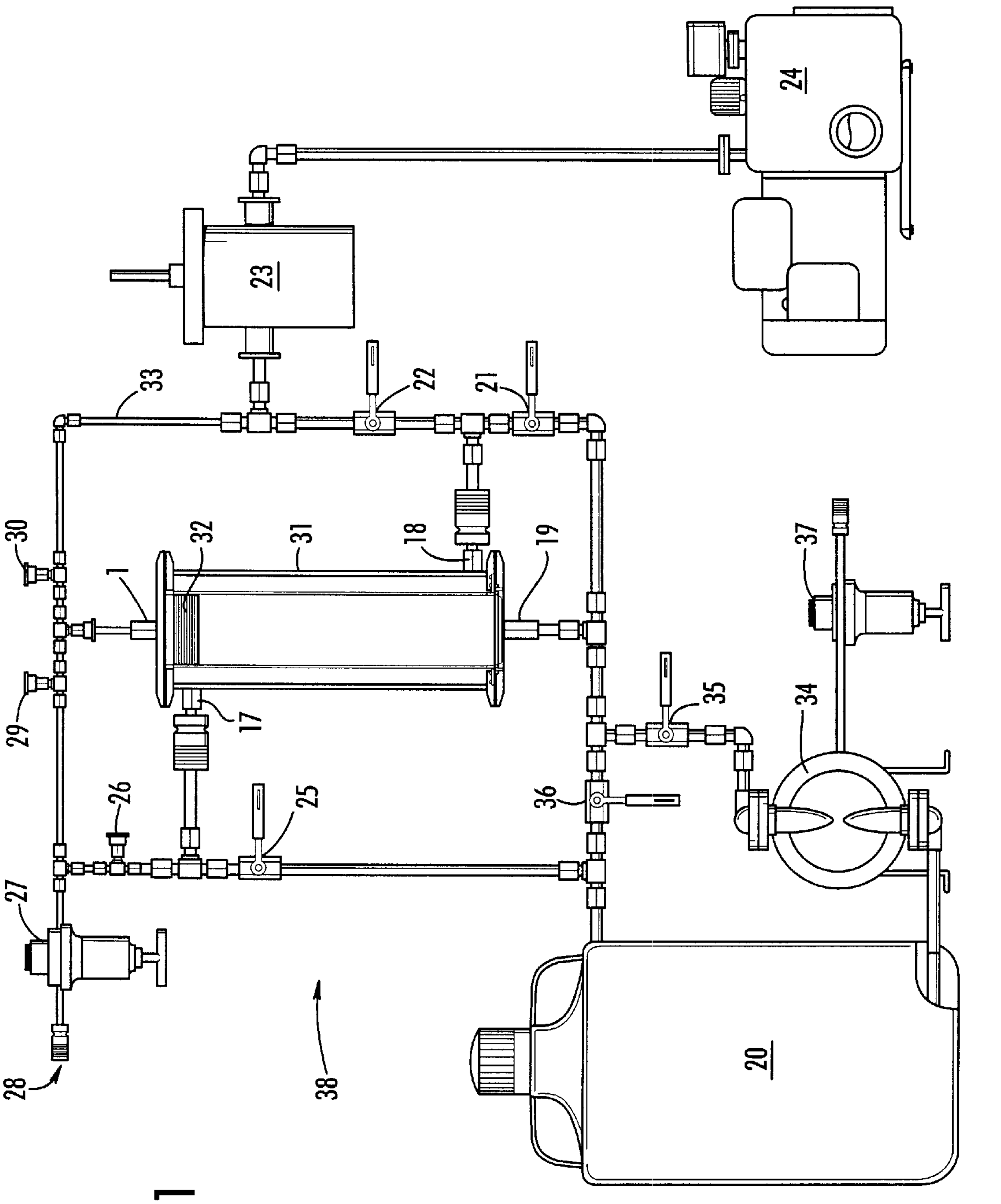
FIG. 1 is a cross-sectional view of the sealed-bladdered chemical processing apparatus with a sealed-bladdered vessel wherein the bladder is not pressurized.

The sealed-bladdered chemical processing method and apparatus were primarily developed to address problems associated with the Saltless Direct Oxide Reduction (SDOR) process, but can be applied to many and varied other processes by one skilled in the art. As an example, within the SDOR process, highly purified uranium metal in powder form is reclaimed from uranium oxide. Numerous steps are involved in the SDOR process and the entire process is very labor intensive as it requires the manual transfer of various mixtures from container to container within an oxygen-free glove box which is kept as dry as possible. Within such transfers is the possibility of contamination, thus degrading the purity of the glove box environment.

The sealed-bladdered chemical processing apparatus 38 consists of a porous, preferably metal, cylinder 6 which is located proximate to or inside an outer cylinder 7. A tube-within-a-tube arrangement is created by attaching both cylinders 6,7 to common flanges 4,16 at each end. The flanges 4,16 are large enough to span the outside diameter of the outer cylinder 7. The inside diameter of the flanges 4,16 may be about the same as the inside diameter of the porous cylinder 6. A circle of porous material, such as a porous metal filter plate, is connected or fitted in the inner diameter of the bottom flange 15, forming the floor 10 of the porous cylinder 6. The inner diameter of the top flange 4 is open, thus allowing for the various feed materials to be loaded into the porous cylinder 6. The bottom flange 15 mates with the lower flange 16 and serves as a solvent inlet, which allows the solvent to flow through the floor 10. The solvent passes through the wall of the porous cylinder 6 and out through at least one port attached to said sealed-bladdered vessel such as an upper port 17 when leaving the sealed-bladdered vessel 31. The top flange 2 which mates with the upper flange 4, serves as a gas inlet and/or a bladder support. The outer cylinder 7 contains upper 17 and lower 18 ports for liquids and/or gases. A sealed-bladder 32 is attached to the upper flange 2.

The sealed-bladdered chemical processing apparatus 38 operates by actuating various valves that route solvents, rinse water, and gases through or into and out of the cylinders 6,7. The process is started by loading feed material for the process, such as dissolution, into the porous cylinder 6. The porous cylinder 6 is then sealed with the mating flanges 2,4 and 15,16. The process, such as dissolution, is started by flowing the solvent into the sealed-bladdered vessel 31 from the reservoir 20 and through the bottom flange 15. The solvent passes through the floor 10 of the porous cylinder 6 and contacts the feed material. A rapid flow rate can allow constant agitation of the feed material from the floor 10 of the porous cylinder 6. The wall of the porous cylinder 6 is replete with various pores that allow the solvent to pass through but retain any particles larger than the pores. The solvent then exits the sealed-bladdered vessel 31 by the upper port 17 in the outer cylinder 7. The solvent is recirculated from a reservoir 20 back to the sealed-bladdered vessel 31. The solvent is drained from the sealed-bladdered vessel 31 by the lower port 18 in the outer cylinder 7 or through the floor 10. A gas purge, controlled by a sweeping valve 26, is used to purge the liquid from the sealed-bladdered vessel 31. The material is then dried, preferably through a pressure filtration process, wherein the sealed-bladder 32 expands to fill the void area of the porous cylinder 6. The sealed-bladder 32 presses or squeezes the material being processed against the walls and the floor 10 of the porous cylinder 6, decanting any free liquid, hence drying the material to a desired dryness. The material in the porous cylinder 6 can be rinsed by circulating and draining the rinse liquid in the same fashion as the solvent. The sealed-bladder 32 is inflated to pressure filter the material, which then removes the free rinse liquids. The sealed-bladdered vessel 31 is then placed under vacuum from the upper 17 and lower 18 ports in the outer cylinder 7, which vaporizes residual liquid in the material until it reaches a desired condition of dryness. The dry material/product is then removed from the porous cylinder 6.

Figure 2:
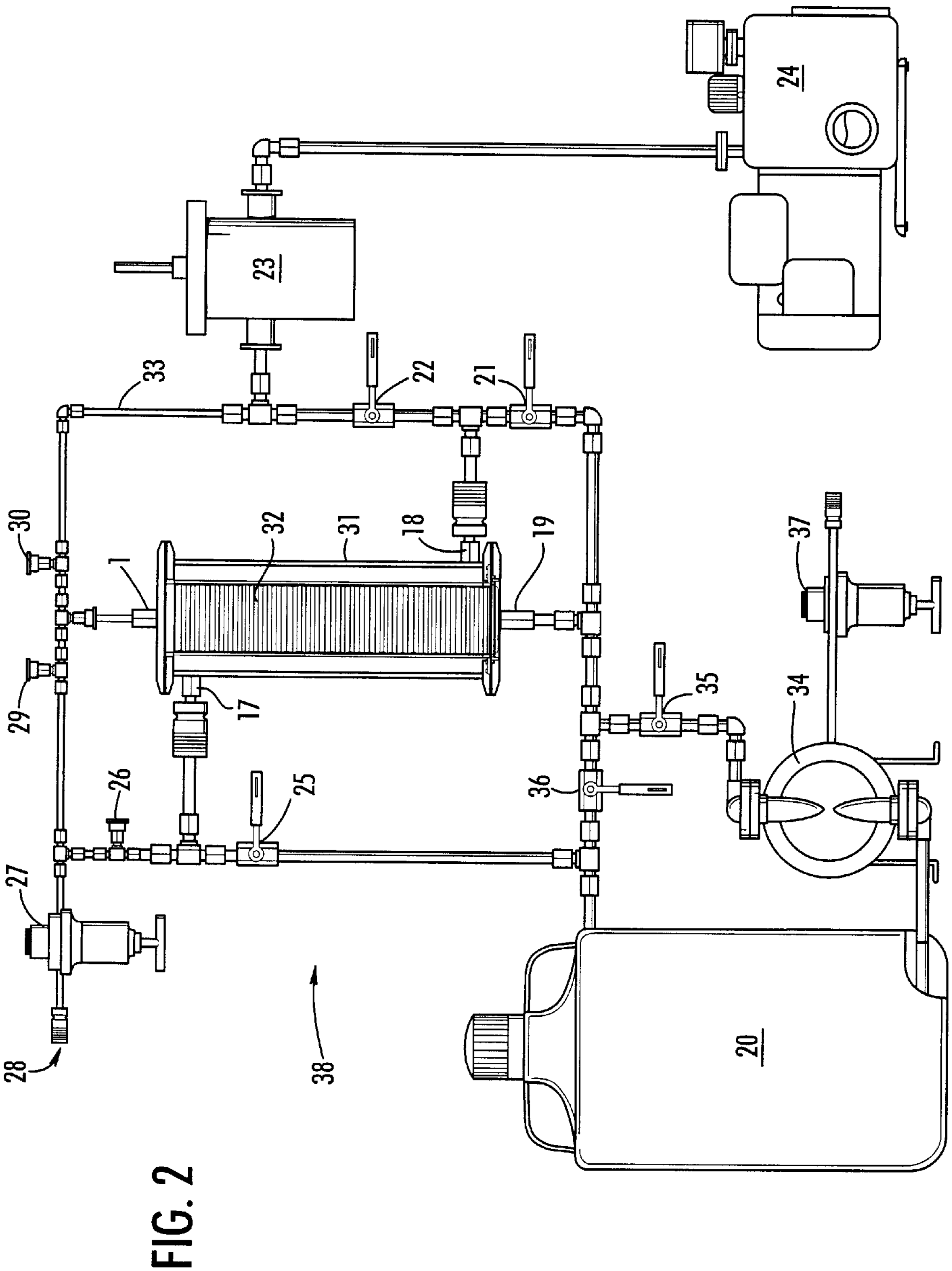
FIG. 2 is a cross-sectional view of the sealed-bladdered chemical processing apparatus with a sealed-bladdered vessel wherein the bladder is pressurized.

FIGS. 1 and 2 disclose one embodiment of a sealed-bladdered chemical processing apparatus 38. In the system, a direct drive vacuum pump 24 is connected to a cold trap 23. The cold trap is used for condensation of gases, removal of particulates and to retain or 'trap-out' all moisture removed from the system by various ways such as vacuum sublimation. The cold trap 23 is connected into a system of piping 33 having a vacuum valve 22 and a lower return valve 21 on the lower end of the system with a deflation valve 30 on the upper end of the system. Between the vacuum valve 22 and the lower return valve 21 a lower port 18 is connected. The lower port 18 is attached to the lower portion of the sealed-bladdered vessel 31 and is used for draining and adding chemicals and rinse from and to the sealed-bladdered vessel 31. Also extending out of the lower portion of the sealed-bladdered vessel 31 is the bottom port 19 which allows for chemicals to flow into and out of the sealed-bladdered vessel 31 and is connected into the system of piping 33. Also connected into the system of piping 33 is a fluid pump 34 which is attached to a lower regulator 37 and a pump valve 35. A back drain 36 is located in the system of piping 33 between the sealed-bladdered vessel 31 and a reservoir 20. Connected into the system of piping 33 between the reservoir 20 and the back drain valve 36 is more piping 33 on which is located an upper return valve 25 and a sweeping valve 26. Between the upper return valve 25 and the sweeping valve 26 is a connection into the upper port 17. The upper port 17 is attached to the upper portion of the sealed-bladdered vessel 31. Also located in the top of the upper portion of the sealed-bladdered vessel 31 is a top port 1 which is connected into the piping 33 between an inflation valve 29 and a deflation valve 30. The inflation valve 29 and the deflation valve 30 are located in the system of piping 33 between a connection leading to the sweeping valve 26 and a connection leading to the cold trap 23. Thus the system of piping 33 forms a continuous system, such as a loop of piping 33, which communicably connect to the sealed-bladdered vessel 31 whereby substances within the continuous loop can be recirculated. The connection leading to the sweeping valve 26 has a branch which connects an upper regulator 27 into the system of piping 33. An exterior inlet 28 is connected into the upper regulator 27 opposite the system of piping 33. In FIG. 1 the sealed-bladder 32 is shown in an non-pressurized position whereas in FIG. 2 the sealed-bladder 32 is expanded into its pressurized position.

Figure 3:
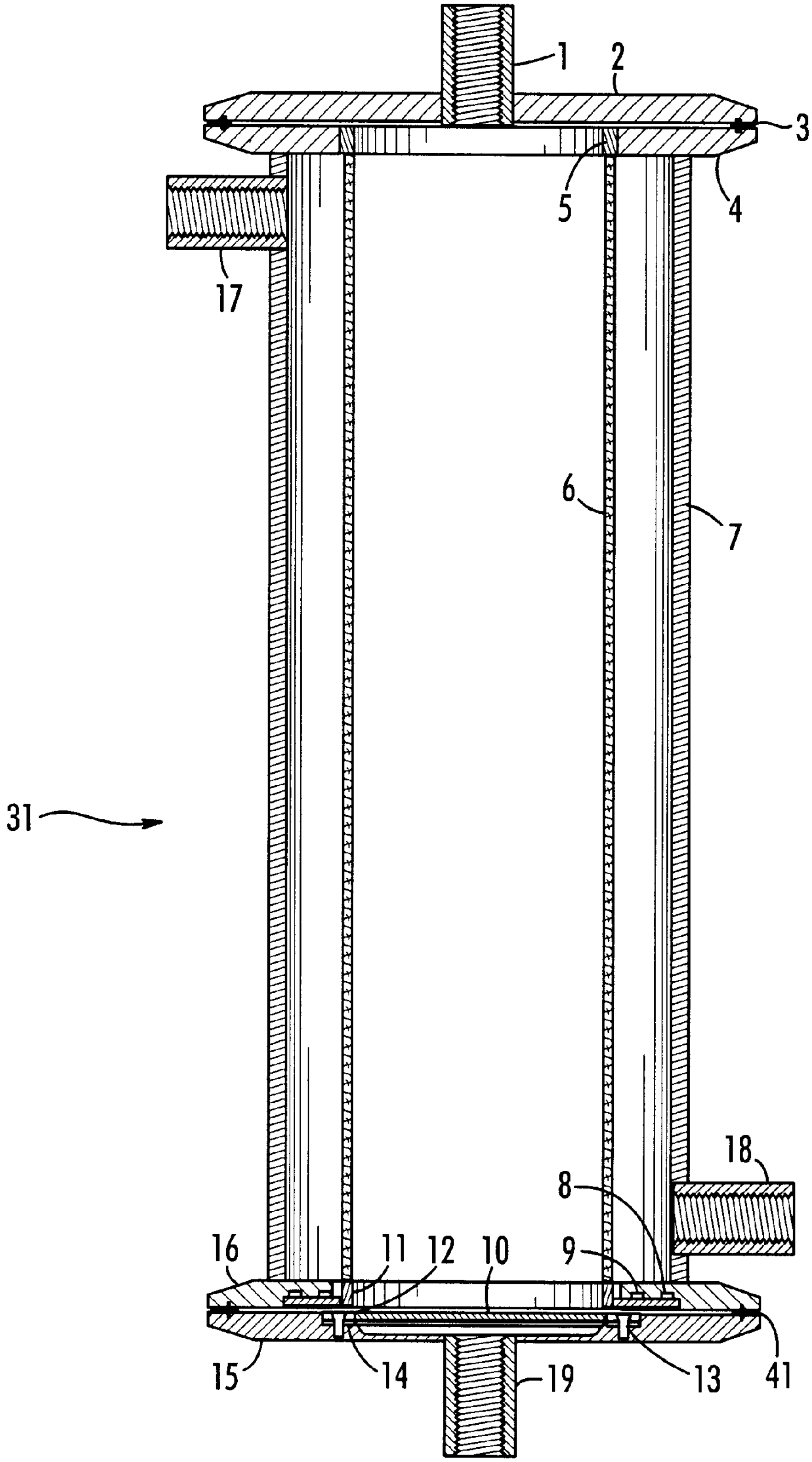
FIG. 3 is a cross-sectional view of the sealed-bladdered vessel without the bladder.

FIG. 3 is a cross-sectional view of the sealed-bladdered vessel 31. The sealed-bladdered vessel 31 is comprised of two sets of mating flanges 2,4 and 15,16 which hold two cylinders 6,7, the porous cylinder 6 with the outer cylinder 7, and have various ports 1,17,18,19 for allowing chemicals, various other materials and gases to flow into and out of the cylinders 6,7. The top flange 2 is mated with the upper flange 4 and may have a first flange sealing means 3 such as a precision fit, a sealant, a seal or a gasket located between the two mating flanges 2,4. Protruding out of the top flange 2 is the top port 1 in which various types of material are inserted into the cylinder at the beginning of the chemical process or the bladder is attached. Within the upper flange 4 may be positioned a threaded ring 5 which helps anchor and seals the porous cylinder 6 in place. Also connected to the upper flange 4 is the outer cylinder 7 which surrounds the porous cylinder 6. Attached to the top portion of the outer cylinder 7 is the upper port 17 which allows for various materials, chemicals and gases to exit the sealed-bladdered vessel 31 and to be recirculated into the system of piping 33 (not shown in FIG. 3). Protruding from the lower end of the outer cylinder 7 is lower port 18. Also at the lower end of both cylinders 6,7 are two mating flanges 15,16 in which the outer cylinder 7 and the porous cylinder 6 are similarly connected as in the upper mating flanges 2,4. The lower flange 16 is mated with the bottom flange 15 and may have a second flange sealing means 41 such as a precision fit, a sealant, a seal or a gasket located between the two mating flanges 15,16. The porous cylinder 6 is held in place, and sealed, within the lower flange 16 by a lower ring 11. Attached to the bottom flange 15 is a bottom port 19 which allows chemicals, various mixtures and gases to flow into and out of the sealed-bladdered vessel 31. Covering the opening in the bottom end of the porous cylinder 6 and inset into the bottom flange 15 is a porous filter plate 10. The porous filter plate may serve as a floor 10 and is connected to the bottom flange 15 by a filter bolt ring 12 and screws 13 and having a floor gasket 14 between them. It may also be desirable to locate within the lower flange 16 and between the porous cylinder 6 and the outer cylinder 7, two O-rings 9,10.

Figure 4:
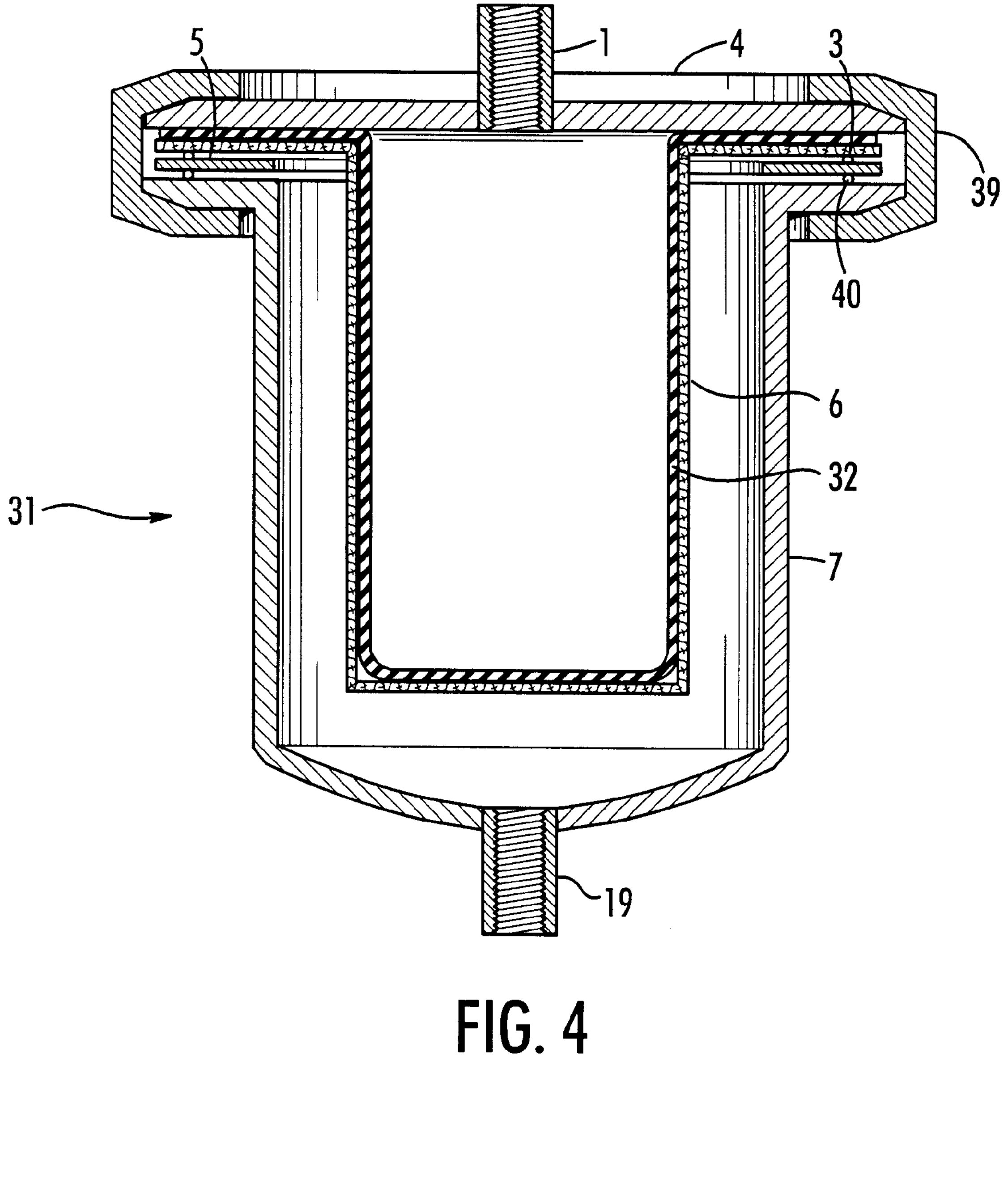
FIG. 4 is a cross-sectional view of a second embodiment of the sealed-bladdered vessel.

FIG. 4 is a cross-sectional view of a second embodiment of a sealed-bladdered vessel 31. In this embodiment, the primary differences are in the shape of the outer cylinder 7 and the lack of lower mating flanges. The sealed-bladdered vessel 31 is comprised of an upper flange 4 on which is attached a bladder pressurization port 1. The outer cylinder 7 has a flanged edge on its upper edge so as to hold, or sandwich, the sealed-bladder 32 between the flanged edge and the upper flange 4. Also located between the upper flange 4 and the flanged edge of the outer cylinder 7 is a flanged edge of a porous cylinder 6 which is layered upon a first flange sealing means 3 layered upon an upper ring 5 which is layered upon a second flange sealing means 40. The upper flange 4 and the flanged edge of the outer cylinder 7 are matingly connected together by a connecting means 39, such as a clamp that is preferably "c" shaped. Also located within the outer cylinder 7 is the main portion of the porous cylinder 6. Located in the bottom of the outer cylinder 7 is a chemical flow port 19.

The sealed-bladdered chemical processing method and apparatus described herein and illustrated in the drawings is subject to other advantages and modifications that may be apparent to those of ordinary skill in the art without departing from the spirit and scope of the appended claims. Accordingly, the invention is to be limited only by the scope of the following claims and their equivalents.

What is claimed is:

1. A sealed-bladdered chemical processing apparatus comprising:

a sealed-bladdered vessel having an outer cylinder, a porous cylinder within said outer cylinder, at least one port attached to said sealed-bladdered vessel and a sealed-bladder located proximate to said porous cylinder;

a system of piping;

said sealed-bladdered vessel being connected to said system of piping;

a vacuum pump, a fluid pump, a reservoir, an exterior inlet into said system of piping and a plurality of valves being connected to said system of piping to form a continuous system whereby substances may be introduced into said system, withdrawn from said system, and circulated therethrough.

2. The apparatus of claim 1, wherein:

said system of piping forms a continuous loop.

3. The apparatus of claim 2, wherein:

said plurality of valves comprises
- a lower return valve,
- a vacuum valve,
- a pump valve,
- a back drain valve,
- an upper return valve,
- a sweeping valve,
- an inflation valve, and
- a deflation valve.

4. The apparatus of claim 3, wherein:

said sealed-bladdered vessel is comprised of a top flange attached to a top port;

said top flange is connected to an upper flange;

a first flange sealing means located between said top flange and said upper flange;

an upper ring located in said upper flange;

said porous cylinder attached to a lower flange and within an outer cylinder;

said outer cylinder attached to said upper flange;

said sealed-bladder attached to said upper flange;

an upper port attached to an upper portion of said outer cylinder;

a lower port attached to a lower portion of said outer cylinder;

said porous cylinder and said outer cylinder attached to said lower flange;

said lower flange connected to a bottom flange;

a second flange sealing means located between said lower flange and said bottom flange;

a floor connected to said bottom flange; and said bottom flange connected to a bottom outlet port;

said sealed-bladdered vessel adapted to receive, treat and remove said material from said sealed-bladdered vessel; and said sealed-bladdered vessel adapted to dry said material, to a desired dryness, by squeezing said material from said sealed-bladdered vessel.

5. The apparatus of claim 3, wherein:

said sealed-bladder vessel is comprised of a top flange attached to a top outlet port;

said outer cylinder having a flanged edge;

said porous cylinder having a flanged edge;

said top flange connected to said flanged edge of said porous cylinder and said flanged edge of said outer cylinder by a connecting means;

said outer cylinder having a bottom port located therein;

an upper ring located between said flanged edge of said porous cylinder and said flanged edge of said outer cylinder;

a first flange sealing means located between said flanged edge of said porous metal cylinder and said upper ring; and a second flange sealing means located between said upper ring and said flanged edge of said outer cylinder;

said sealed-bladdered vessel adapted to receive, treat and remove said material from said sealed-bladdered vessel; and said sealed-bladdered vessel adapted to dry said material, to a desired dryness, by squeezing said material from said sealed-bladdered vessel.

6. A sealed-bladdered vessel comprising:

an outer cylinder;

a porous cylinder within said outer cylinder;

at least one port attached to said sealed-bladdered vessel; and a sealed-bladder located proximate to said porous cylinder.

7. The vessel of claim 6, further comprising:

a top flange attached to a top port;

said top flange connected to an upper flange;

a first flange sealing means located between said top flange and said upper flange;

an upper ring located within said upper flange;

said porous cylinder attached to a lower flange;

said outer cylinder attached to said upper flange;

said sealed-bladder attached to said upper flange;

an upper port attached to an upper portion of said outer cylinder;

a lower port attached to a lower portion of said outer cylinder;

said porous cylinder and said outer cylinder attached to said lower flange;

said lower flange connected to a bottom flange;

a second flange sealing means located between said lower flange and said bottom flange;

a floor connected to said bottom flange; and said bottom flange connected to a bottom port;

said sealed-bladdered vessel adapted to receive, treat and remove said material from said sealed-bladdered vessel; and said sealed-bladdered vessel adapted to dry said material, to a desired dryness, by squeezing said material from said sealed-bladdered vessel.

8. The vessel of claim 6, further comprising:

a top flange attached to a top port;

said outer cylinder having a flanged edge;

said porous cylinder having a flanged edge;

said top flange connected to said flanged edge of said porous cylinder and said flanged edge of said outer cylinder by a connecting means;

said outer cylinder having a bottom port located therein;

said sealed-bladdered vessel adapted to receive, treat and remove said material from said sealed-bladdered vessel; and said sealed-bladdered vessel adapted to dry said material, to a desired dryness, by squeezing said material from said sealed-bladdered vessel.

9. The vessel of claim 8, further comprising:

an upper ring located between said flanged edge of said porous cylinder and said flanged edge of said outer cylinder;

a first flange sealing means located between said flanged edge of said porous cylinder and said upper ring; and a second flange sealing means located between said upper ring and said flanged edge of said outer cylinder.

10. A method for processing chemicals comprising the steps of:

placing materials into a sealed-bladdered vessel comprised of an outer cylinder, a porous cylinder within said outer cylinder, at least one outlet port attached to said sealed-bladdered vessel and a sealed-bladder located proximate to said porous cylinder, said sealed-bladder vessel being connected into a system of piping;

treating said material;

drying said material to a desired dryness; and removing said material from said sealed-bladdered vessel.

11. The method of claim 10, wherein said step of treating said material further comprises:

closing and sealing said sealed-bladdered vessel;

routing solvent into said porous cylinder;

passing said solvent through said porous cylinder into said outer cylinder;

routing said solvent out of said outer cylinder;

circulating said solvent into a reservoir;

recirculating said solvent back into said sealed-bladdered vessel;

draining said solvent from said sealed-bladdered vessel;

purging gases from said sealed-bladdered vessel;

rinsing any of said material remaining in said sealed-bladdered vessel by passing rinse liquid through said porous cylinder into said outer cylinder;

draining said rinse liquid from said outer cylinder;

inflating a sealed-bladder within said porous cylinder to pressure filter material remaining in said porous cylinder that has been rinsed; and removing liquid remaining in said sealed-bladdered vessel.

12. The method of claim 11, wherein said step of treating said materials further comprises:

inflating said sealed-bladder within said porous cylinder to pressure filter material remaining in said porous cylinder that had been treated with solvent.

13. The method of claim 11, wherein said step of drying said material further comprises:

placing said sealed-bladdered vessel under vacuum, said step of placing vaporizes liquid remaining in said sealed-bladdered vessel and presses or squeezes said materials remaining in said sealed bladdered vessel to a desired condition of dryness.

* * * * *